Figure 1:
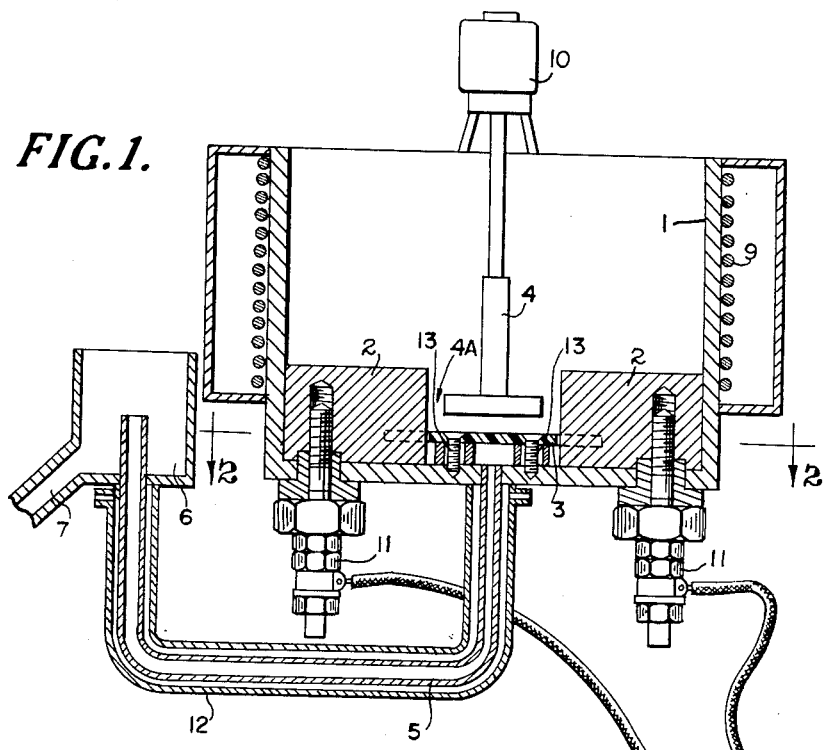

June 13, 1961

W. P. J. VAN BERKEL 2,988,581
PROCESS AND APPARATUS FOR MELTING OR CONCENTRATING
TO A MELT SOLUTIONS OF UREA AND
OTHER ORGANIC COMPOUNDS

Filed Dec. 2, 1955

2 Sheets-Sheet 1

INVENTOR
WILHELM P. J. VAN BERKEL

BY Cushman, Darby & Cushman
ATTORNEYS

United States Patent Office 2,988,581
Patented June 13, 1961

2,988,581
PROCESS AND APPARATUS FOR MELTING OR CONCENTRATING TO A MELT SOLUTIONS OF UREA AND OTHER ORGANIC COMPOUNDS
Wilhelm P. J. Van Berkel, Beek, Netherlands, assignor to Stamicarbon N.V., Heerlen, Netherlands
Filed Dec. 2, 1955, Ser. No. 550,732
Claims priority, application Netherlands Dec. 2, 1954
12 Claims. (Cl. 13—23)

The present invention relates to a process and an apparatus for melting, or for concentrating to a melt, solutions of urea and other organic compounds which, like urea, are practically non-conductors of electricity when solid but which conduct electricity in the molten or dissolved state and which are liable to decompose if overheated.

It is an object of the present invention to devise a method of melting an electrical non-conductor in a more efficient way than has been possible in the past.

A further object is to rapidly concentrate or evaporate a melt solution of organic compound by the use of an electric current.

Another important object of the invention is to devise an apparatus suitable for the melting of non-conductors.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The method according to the invention may be usefully applied in the forming of urea and other compounds into pills or tablets, involving the initial production of a melt of the compound. While the invention will be more particularly described in connection with the formation of a urea melt, it is to be understood that it is equally applicable to other organic compounds having similar properties as referred to above. Such compounds should have a specific resistance of over 10 million ohms cm., in the unmolten state, and show limited conductivity as a result of a much lower specific resistance, e.g., 100 to 200,000 ohms cm., and preferably not over $10^6$ ohms cm. in the molten state, there being no limit to lower values in this case.

Examples of such compounds are acetamide, benzoic acid, maleic anhydride, phthalic anhydride, adipic acid, salicylic acid, tartaric acid, camphor. This development of heat by direct passage of an electric current may also be used for evaporating and concentrating to a melt solutions of such organic compounds, provided solution has a specific resistance of not over 100,000 ohms cm.

In this manner, it is possible to rapidly concentrate to a practically 100% melt solutions, of the above mentioned compounds with substantially no decomposition of the material occurring.

It has been found that, in contrast to crystalline urea, which does not or barely conducts the current (specific resistance $10^7$ Ω cm.), molten urea and concentrated urea solutions have sufficient electric conductance for generating the desired heat therein. Molten urea has a specific resistance of about 200 Ω cm. at a temperature of about 140° C.

If powdered urea is continuously or periodically added to a molten bath of urea through which an electric current is passed and in which the powder is kept homogeneously distributed by means of a stirrer, this powder is very quickly brought into the liquid state.

It will be clear that the heat required for melting the urea is generated in the liquid phase, as it is this phase which has such a low resistance that sufficient conduction occurs for generating the desired heat according to the formula:

$$W/t = i^2R$$

($W$=heat, $t$=time, $i$=current intensity, $R$=resistance.)

Though the powder to be melted, which is added to an existing melt, either does not, or barely does conduct electricity, the surface layer of a solid particle, as soon as melting takes place therein, becomes conductive, thereby causing heat to be generated on the surface of a solid particle, so that the particle will quickly melt further.

It is a great advantage of the present process that this heat is developed in the molten surface layer, so that it need not be transferred to the melting surface, as is necessary if other melting methods are applied, where the heat is introduced by thermal conduction via a solid wall.

In the presence of a solid wall between the material to be melted and the heating medium, the heat transfer is determined by the temperature difference between the wall and liquid, and, with a poor thermal conductor, which molten urea is by nature, this temperature difference has to be relatively great, e.g., 30° C., if melting is to be rapid and, consequently, a film of urea at the wall will become overheated and in this film decomposition and biuret formation will take place.

When applying the process according to the invention, in which the heat takes place by direct passage of current in the liquid phase, there is no heat transfer via a solid wall, so that, consequently, overheating does not come into question.

It has been found that, when carrying out the process according to the invention, the temperature of the solid urea-urea melt suspension need be kept only a few degrees, e.g., 3 to 8° C., over the melting point of urea, so as to be able to discharge a large amount of infed urea in the form of a crystal free melt.

The suspension of solid urea in a urea melt, the liquid of which has a temperature of some degrees over the melting point, loses its thermostability at a low degree of consistency. Consistency is defined as the number of grams of solid substance per 100 grams of suspension. Loss of thermostability results in solidification as soon as the supply of heat is stopped. The compositions at the thermostability limit can be calculated and, it appears thereby, that the permissible consistency for urea is, at the liquid temperature mentioned:

4.1% at 5° C. over the melting point
8.0% at 10° C. over the melting point
11.5% at 15° C. over the melting point In such a suspension of solid, non-conductive particles in a conductive liquid there exists a relation between the consistency and the electric resistance, so that it is possible to measure the consistency by a resistance measurement in an electronical way without any time lag and so directly to control the supply of heat in dependence hereon.

The formation of biuret, which may take place in melting urea or in heating concentrated urea solutions, appears to depend upon the temperature and on the time the material is maintained at this temperature; at a temperature of a few degrees over the melting point, the time is the main consideration. In general, the higher the temperature, the greater the biuret formation in a given interval of time.

In order that in melting or heating the stay of the material to be melted or heated in the apparatus may be made short, e.g., one minute or shorter, a compact heating vessel for heating by direct passage of electric current was designed, in which heating vessel the effective electrode surface area is large and the distance between the electrode surfaces is small. The distance between the electrodes in this vessel is for instance 0.5 to 3 cm., the total electrode surface being for instance 10 to 200 square decimeters.

Due to the large electrode surface area and the relatively short distance between the electrodes, it has become possible to introduce a large amount of electric energy into the heating vessel per unit of time, as a result of which, a large amount of urea can be continuously converted from the solid into the liquid state at a stay in the vessel of less than one minute.

Figure 2:
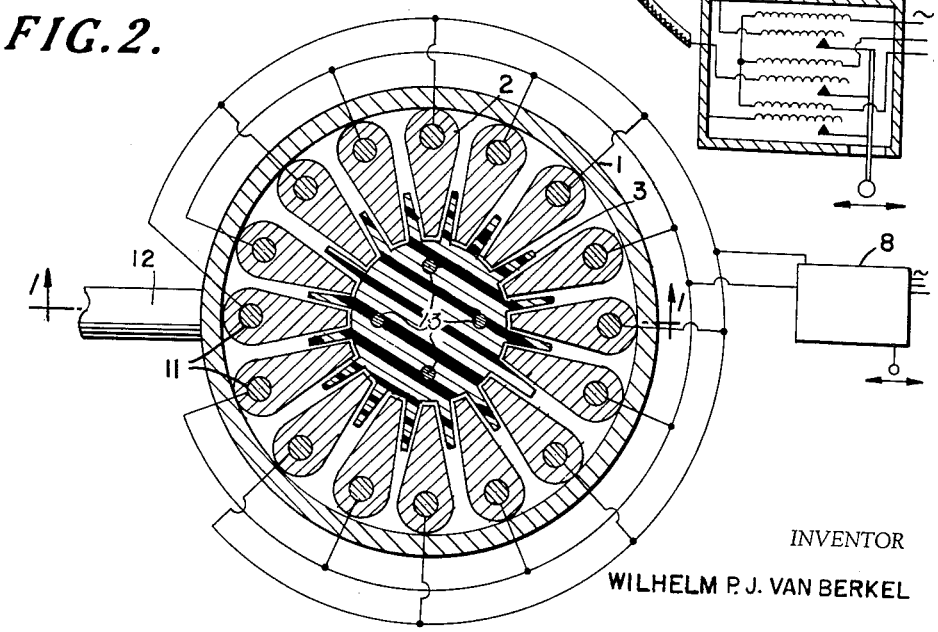
Figure 3:
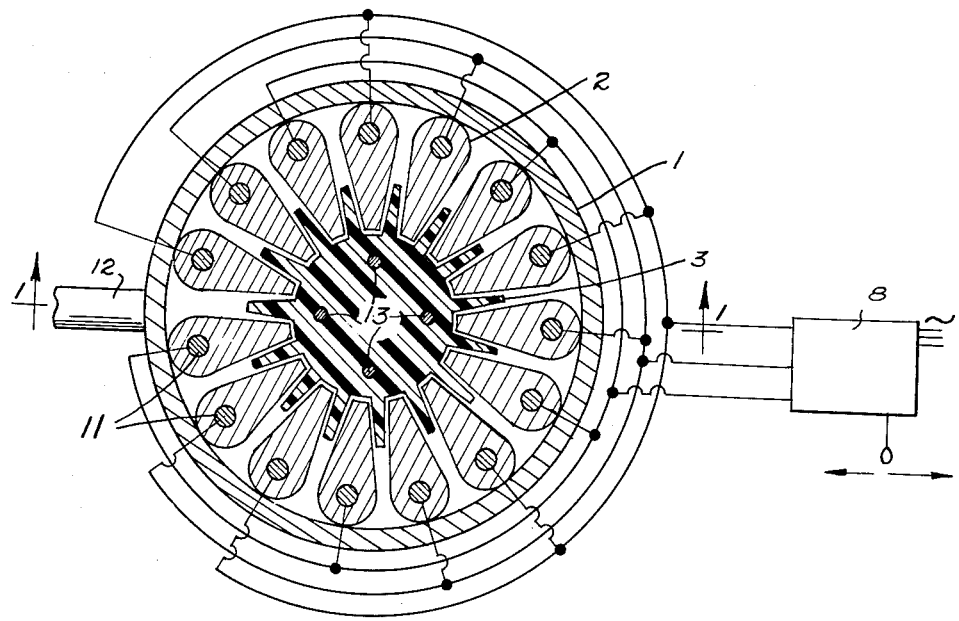

An embodiment of the heating vessel according to the invention is shown in vertical section (according to line 1—1 in FIGURE 2) in FIGURE 1, while FIGURE 2 gives a horizontal section (according to line 2—2 in FIGURE 1). FIG. 3 shows schematically a fifteen terminal connection for three phase operation. The heating vessel comprises a tank 1, in which there are mounted a number of electrodes 2.

In the embodiment according to the figures, the electrodes are arranged radially, however, they may be placed otherwise in the tank. The electrodes may be made of any good conductor, not subject to corrosion; particularly good results have been obtained with carbon electrodes.

The radially mounted electrodes are spaced by means of a non-conductive star-shaped plate 3 which is supported by being bolted to tank 1 with bolts 13.

Furthermore, there is a stirrer 4 which is mounted in a free space 4a, not occupied by electrodes, and which may or may not be made of a conductive material, while a discharge conduit 5 is connected to the bottom. This discharge conduit may be heated by steam, electricity, or other means 12. It debouches as an overflow pipe into an auxiliary tank 6 provided with a discharge pipe 7.

To the bottom of the tank, there are attached terminals 11 which establish the connection between the electrodes and a voltage source, e.g., a variable transformer 8 with a maximum capacity of, for example, 750 amperes at 220 volts.

Depending upon whether a two or three phase current is used, the number of electrodes will preferably be a multiple of two and three. In FIGURE 2, two of the three output phases of variable transformer 8 are connected alternately to the sixteen terminals 11. FIGURE 3 is a similar schematic illustration showing fifteen terminals 11 connected to the three output phases of transformer 8. If urea is to be melted by means of this apparatus, a typical procedure is as follows:

After filling the apparatus with an amount of molten urea or a concentrated, e.g., 90%, solution of urea, applying a voltage to the electrodes and setting the stirrer moving, powdery urea is introduced preferably continuously into the free space 4a. The stirrer works such a turbulence in the suspension of solid substance in liquid, that the considerable excess of solid matter at the introductory spot is rapidly dispersed. By the pushing action of the stirrer, the suspension is forced along the upper side of the plate 3 through the slit-shaped openings between the electrodes; the majority of the suspension flows, after having collided with the wall of the tank, upwards along this wall and, subsequently, returns into the stirrer compartment. In addition to this circulatory current over plate 3, there is, preferably, continuous drainage along the underside of plate 3 to the discharge conduit 5.

This latter current is relatively slow, as the influence of the stirrer is hardly noticeable, so that any solid material which might not yet have melted has ample opportunity to pass into the liquid phase.

As the discharge conduit 5 debouches as an overflow pipe into an auxiliary tank 6, the liquid level in the melting vessel proper is always kept constant. The part of the wall of the melting vessel extending above the liquid level is provided with a heating spiral or steam jacket 9; this heating device serves to melt away at once any material which might have become solid and have caked on the wall.

The voltage difference between the electrodes causes a direct passage of electricity through the conductive melt as a result of which heat is generated, which is used for melting any solid material still suspended in the liquid. If the distance between two electrode surfaces is the same everywhere, the current intensity and, hence, the heat developed will also be the same everywhere. In order to obtain a uniform heat development everywhere between the radially arranged electrodes, these electrodes have been given a tapered shape. Besides, the electrodes are made of a material, e.g., carbon, which has a much higher conductivity than the liquid phase in the melting vessel, so that the heat development in the electrodes is negligibly small, as compared with the heat development in the liquid phase; consequently, the temperature of the electrodes is not higher than that of the liquid phase. When an alternating current with a frequency of 50 cycles per second is applied in the melting of urea, the wear of the electrodes is very low, namely, 6 to 10 grams per ton of urea melt produced. It appeared, after some hundreds of tons of urea had been produced, however, that the electric resistance became considerably higher as a result of the increase of the distance between the electrodes on account of the wear of the electrodes. This electrode wear can be counteracted by applying an alternating current of higher frequency, e.g., 100 cycles per second. In order to keep the electrical apparatus used as simple as possible, the frequency is preferably 50 cycles per second or a multiple of 50 cycles per second, e.g. 100 cycles per second, 150 cycles per second, 200 cycles per second, etc. A direct current can also be used, but an alternating current has been found preferable.

The melting vessel illustrated in FIGURES 1 and 2 has an internal diameter of 50 cm., the height of the electrodes is 10 cm., their length is 13.5 cm., while the effective electrode surface area is 54 sq. decimeter; the distance between the electrodes is 1 cm. The volume of the spaces between the electrodes is 2700 cu. cm. in total, the volume of the free space in which the stirrer is located amounting to 4150 cu. cm.

*Example 1*

Such an apparatus continuously melted 625 kg. of solid urea per hour, i. e., 15 tons each 24 hours of use at a feed of 100 kva. per hour via a controllable transformer with a maximum capacity of 750 A. at 220 v., using a 2 phase alternating current with a frequency of 50 cycles per second. The biuret content in the molten urea was lower than 0.15%. Taking into account the electric efficiency of the transformer, an overall electric efficiency of 96% was obtained. The urea melted in this way provides an excellent starting material for the preparation of urea pills, in which process the melt is sprayed to form drops which are allowed to solidify in a rising current of gas or in a liquid in which the urea does not dissolve.

*Example 2*

This example illustrates the procedure for concentrating a solution of urea from 74% to 95%.

Urea was supplied to the apparatus in the form of a 74% solution at the rate of 20 tons per day. The supply temperature was 85° C.; in the apparatus there prevailed a vacuum pressure of 300 mm. Hg. The concentrated solution withdrawn from the apparatus contained 95% urea, the rest being water. The temperature of this solution was 130° C., its specific resistance at this temperature 184 Ω cm. In order to obtain this concentration an electric energy of 135 kva. per hour was supplied to the apparatus.

*Example 3*

This example illustrates the procedure for concentrating a solution of urea from 95% to 99.7%.

The 95% urea solution was supplied to the apparatus at the rate of 16 tons per day. The supply temperature was 130° C., the temperature of the solution leaving the apparatus amounted to 150° C. The specific resistance of the product at 150° C. was 158.7 Ω cm. The supply of electric energy in this case amounted to 30 kva./hr.

*Example 4*

This example illustrates the procedure for concentrating a solution of glucose from 16.6% to 50%.

The glucose solution was supplied to the apparatus at the rate of 12 tons per day and at a temperature of 50° C. The specific resistance of this 16.6% aqueous solution at this temperature amounted to 3000 Ω cm.

The concentrated 50% solution leaving the apparatus had a temperature of 100° C. and its specific resistance at this temperature was 1120 Ω cm. The supply of electric energy amounted to 250 kva. per hour.

I claim:

1. In a process for forming a melt of a solid organic compound which, when solid, has a specific resistance of at least about 10 million ohms cm. but which, when in a liquid state, shows a specific resistance not over about one million ohms cm., the improvement comprising generating the heat for maintaining the melt by direct passage of an electric current through a portion of the compound in the molten state and adding the balance of the compound in non-molten form during the passage of electricity and recovering the molten product.

2. A process according to claim 1, wherein the current is an alternating current.

3. A process according to claim 1, wherein said balance of the compound is added in solid form and is melted by the electric current.

4. A process according to claim 1, wherein the compound is urea.

5. A process according to claim 4, wherein the current is an alternating current of a frequency of at least 50 cycles per second.

6. A process according to claim 1, wherein said balance of the compound is added as a dilute solution in a more volatile solvent and is concentrated by the electric current.

7. A process according to claim 1 wherein the temperature of the melt is maintained not more than a few degrees above the melting point of the organic compound.

8. A process according to claim 7 wherein the organic compound is urea and the temperature of the melt is not more than 15° C. above the melting point of urea.

9. A process according to claim 8 wherein the temperature of the melt is maintained at not more than 8° C. above the melting point of urea.

10. An apparatus, suitable for melting a substantially non-conductive solid organic compound or concentrating a solution thereof to a melt, which compound has electric conductivity in the molten state, comprising a vessel provided with a plurality of radially arranged electrodes having a large effective surface area and which electrodes are placed in close but non-touching proximity to each other, means for forcing liquid contained in the vessel to circulate through the narrow spaces between the electrodes, means to withdraw molten compound from the vessel and a centrally disposed star-shaped plate having slits therein uniformly separating said electrodes.

11. An apparatus according to claim 10, wherein said star-shaped plate is of lesser thickness than the electrodes and the means for forcing liquid comprises a stirrer.

12. An apparatus according to claim 10, wherein the vessel is a vertical vessel, the electrodes are arranged radially, there is a centrally disposed star-shaped plate having slits therein uniformly separating said electrodes, the star-shaped plate is of lesser thickness than the electrodes and above the star-shaped plate and centrally disposed in relation to the electrodes there is a stirrer adapted to force liquid in the vessel to circulate through said slits and between the electrodes.

References Cited in the file of this patent

UNITED STATES PATENTS

| | | |
|---|---|---|
| 771,250 | Horry | Oct. 4, 1904 |
| 1,717,308 | Boschetti | June 11, 1929 |
| 1,782,482 | Seifert et al. | Nov. 25, 1930 |
| 2,300,891 | Hanks | Nov. 3, 1942 |
| 2,370,238 | Fisher | Feb. 27, 1945 |
| 2,666,127 | Johnson | Jan. 12, 1954 |
| 2,749,379 | Geffcken et al. | June 5, 1956 |
| 2,802,928 | Fisher | Aug. 13, 1957 |

OTHER REFERENCES

Hall: Transactions, Amer. Soc. Steel Treating, vol. 16, pp. 399–404 (1929).